US012791385B2

(12) United States Patent
Lee et al.

(10) Patent No.: US 12,791,385 B2
(45) Date of Patent: Nov. 10, 2026

(54) APPARATUS AND METHOD FOR INSPECTING AND MEASURING SEMICONDUCTOR DEVICE

(71) Applicant: SAMSUNG ELECTRONICS CO., LTD., Suwon-si (KR)

(72) Inventors: Hyeongcheol Lee, Suwon-si (KR); Minsu Kim, Suwon-si (KR); Jeongho Ahn, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 649 days.

(21) Appl. No.: 18/102,514

(22) Filed: Jan. 27, 2023

(65) Prior Publication Data

US 2023/0332954 A1 Oct. 19, 2023

(30) Foreign Application Priority Data

Apr. 18, 2022 (KR) ........................ 10-2022-0047626
May 9, 2022 (KR) ........................ 10-2022-0056885

(51) Int. Cl.

| | |
|---|---|
| ***G01J 3/28*** | (2006.01) |
| ***G01J 3/02*** | (2006.01) |
| ***G01N 21/88*** | (2006.01) |
| ***H04N 25/71*** | (2023.01) |
| *G01N 21/956* | (2006.01) |

(52) U.S. Cl.
CPC ........... *G01J 3/2823* (2013.01); *G01J 3/0291* (2013.01); *G01N 21/8806* (2013.01); *H04N 25/71* (2023.01); *G01N 21/956* (2013.01)

(58) Field of Classification Search
CPC .................. G01J 3/2823; G01J 3/0291; G01J 2003/1213; G01J 3/0208; G01J 3/0224; G01J 3/027; G01J 3/06; G01J 3/513; G01N 21/8806; G01N 21/956; G01N 21/9501; H04N 25/71; H04N 25/10
See application file for complete search history.

(56) References Cited

U.S. PATENT DOCUMENTS 7,095,511 B2 8/2006 Chalmers et al.
9,733,178 B2 8/2017 Ryu et al.
(Continued)

FOREIGN PATENT DOCUMENTS

CN 109690748 * 4/2019
CN 109690748 A * 4/2019 ............ G01N 1/286
(Continued)

OTHER PUBLICATIONS

Adam Ginsburg, Spectral-Cubes: Doc, Section: Documentation of a Spectral Cube, 2016 (Year: 2016).*
(Continued)

*Primary Examiner* — Abdullahi Nur
(74) *Attorney, Agent, or Firm* — Sughrue Mion, PLLC

(57) ABSTRACT

An apparatus for inspecting and measuring a semiconductor device includes a stage on which an object to be measured is provided, a detector configured to detect a spectral image from light reflected from the object to be measured, and a processor configured to generate a spectral matrix based on the spectral image detected by the detector, wherein detector includes a time delayed integration (TDI) sensor configured to detect the spectral image based on a TDI process.

11 Claims, 25 Drawing Sheets

(56) References Cited

U.S. PATENT DOCUMENTS

| | | | | |
|---|---|---|---|---|
| 10,416,088 | B2 | 9/2019 | Duffy et al. | |
| 10,551,320 | B2 | 2/2020 | Haller | |
| 10,801,953 | B2 | 10/2020 | Wang et al. | |
| 11,035,790 | B2 | 6/2021 | Kim | |
| 11,037,283 | B2 | 6/2021 | Jang et al. | |
| 2020/0184624 | A1* | 6/2020 | Jang | G01J 3/021 |
| 2021/0295495 | A1* | 9/2021 | Li | G06T 7/0006 |
| 2022/0376465 | A1* | 11/2022 | Shirasaki | H01S 5/0014 |

FOREIGN PATENT DOCUMENTS

| | | | | | |
|---|---|---|---|---|---|
| CN | 110301038 | A | * | 10/2019 | H10P 74/203 |
| CN | 115244389 | | * | 10/2022 | |
| CN | 115244389 | A | * | 10/2022 | G01N 21/8806 |
| JP | 2020-505607 | A | | 2/2020 | |
| KR | 10-2012-0120847 | A | | 11/2012 | |
| KR | 10-2016-0012476 | A | | 2/2016 | |
| KR | 10-2020-0058575 | A | | 5/2020 | |
| KR | 10-2021-0062713 | A | | 5/2021 | |
| WO | WO-2014052811 | A1 | * | 4/2014 | G01B 11/02 |

OTHER PUBLICATIONS

Communication dated Jul. 29, 2026 issued by the Korean Ministry of Intellectual Property in Korean Patent Application No. 10-2022-0056885.

* cited by examiner

APPARATUS AND METHOD FOR INSPECTING AND MEASURING SEMICONDUCTOR DEVICE

CROSS-REFERENCE TO RELATED APPLICATIONS

This application is based on and claims priority under 35 U.S.C. § 119 to Korean Patent Application No. 10-2022-0056885, filed on May 9, 2022, and Korean Patent Application No. 10-2022-0047626, filed on Apr. 18, 2022, in the Korean Intellectual Property Office, the disclosures of which are incorporated by reference herein in their entireties.

BACKGROUND

The present disclosure relates to an apparatus and method for inspecting and measuring a semiconductor device, and more particularly, to an apparatus and method for inspecting and measuring a semiconductor device using a spectral image.

A semiconductor device is manufactured using a wafer and through multiple manufacturing processes. Therefore, after performing several semiconductor device manufacturing processes on the wafer, it may be necessary to inspect or measure the result of the manufacturing process quickly.

As the semiconductor manufacturing process is highly integrated, three-dimensional (3D) profile measurement technology for semiconductor micro patterns and complex structures is being developed. Recently, in the case of memory and logic products, wafers have been produced using micro processing technology having a linewidth of 20 nm or less, and thus, high-speed micro pattern process monitoring technology is required to improve wafer yield and quality. Defective process inspection and profile measuring technology may be classified into an optical method and a method using an electron beam, with the optical method typically having better the inspection speed.

In a related art apparatus for inspecting and measuring a semiconductor device, a detector does not include a spectral camera and/or a time delayed integration (TDI) camera. Therefore, in order to obtain a spectral image of a wafer, a related art apparatus for inspecting a semiconductor device of the related art requires photographing the wafer a plurality of times by rotating components of the apparatus for inspecting a semiconductor device, in order to form a two-dimensional space spectral image for a wafer. In addition, it has been unclear how utilize the spectral image obtained by the apparatus for inspecting a semiconductor device.

SUMMARY

Provided are an apparatus and method for inspecting and measuring a semiconductor device having an improved measurement precision and inspection speed and an improved processing rate.

Additional aspects will be set forth in part in the description which follows and, in part, will be apparent from the description, or may be learned by practice of the presented embodiments.

According to an aspect of an example embodiment, an apparatus for inspecting a measuring a semiconductor device may include a stage on which an object to be measured is provided, a detector configured to detect a spectral image from light reflected from the object to be measured, and a processor configured to generate a spectral matrix based on the spectral image detected by the detector, where detector may include a time delayed integration (TDI) sensor configured to detect the spectral image based on a TDI process.

According to an aspect of an example embodiment, an apparatus for inspecting and measuring a semiconductor device may include a stage on which an object to be measured is provided, a light source configured to emit broadband incident light, a first polarizer configured to change a first polarization characteristic of the broadband incident light emitted by the light source, an object lens configured to transmit the broadband incident light and transmit light reflected from a surface of the object to be measured, a second polarizer configured to change a second polarization characteristic of the reflected light, a detector configured to detect a spectral image from the reflected light, a light-condensing optical system configured to form an exit pupil of the object lens on the detector, and a processor configured to generate a spectral matrix based on a plurality of spectral images detected by the detector. The stage may be configured to be movable in a horizontal direction. The detector may include a TDI sensor and a plurality of wavelength filters provided on the TDI sensor. The detector may be further configured to detect the spectral image with the TDI sensor based on a TDI process, and detect a certain wavelength band with the plurality of wavelength filters.

According to an aspect of an example embodiment, a method of inspecting and measuring a semiconductor device may include providing an object to be measured, extracting a plurality of spectral images from light reflected from the object to be measured in a TDI process, generating a spectral matrix based on the plurality of spectral images, discriminating a care area of the object to be measured, and inspecting the care area. A defect of the object to be measured is inspected and a structure of the object to be measured may be measured based on the plurality of spectral images.

BRIEF DESCRIPTION OF THE DRAWINGS

The above and other aspects, features, and advantages of certain example embodiments of the present disclosure will be more apparent from the following description taken in conjunction with the accompanying drawings, in which.

DETAILED DESCRIPTION

Figure 1:
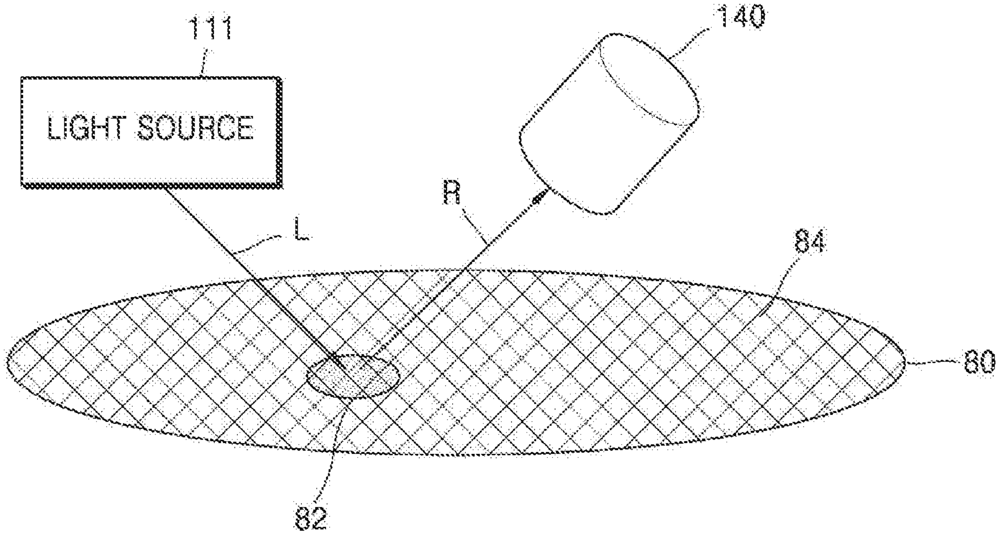
FIG. 1 is a diagram of an apparatus for inspecting and measuring a semiconductor device, according to an example embodiment.

Hereinafter, embodiments are described in detail with reference to the accompanying drawings. In the drawings, like numerals denote like elements and redundant descriptions thereof will be omitted.

Figure 2:
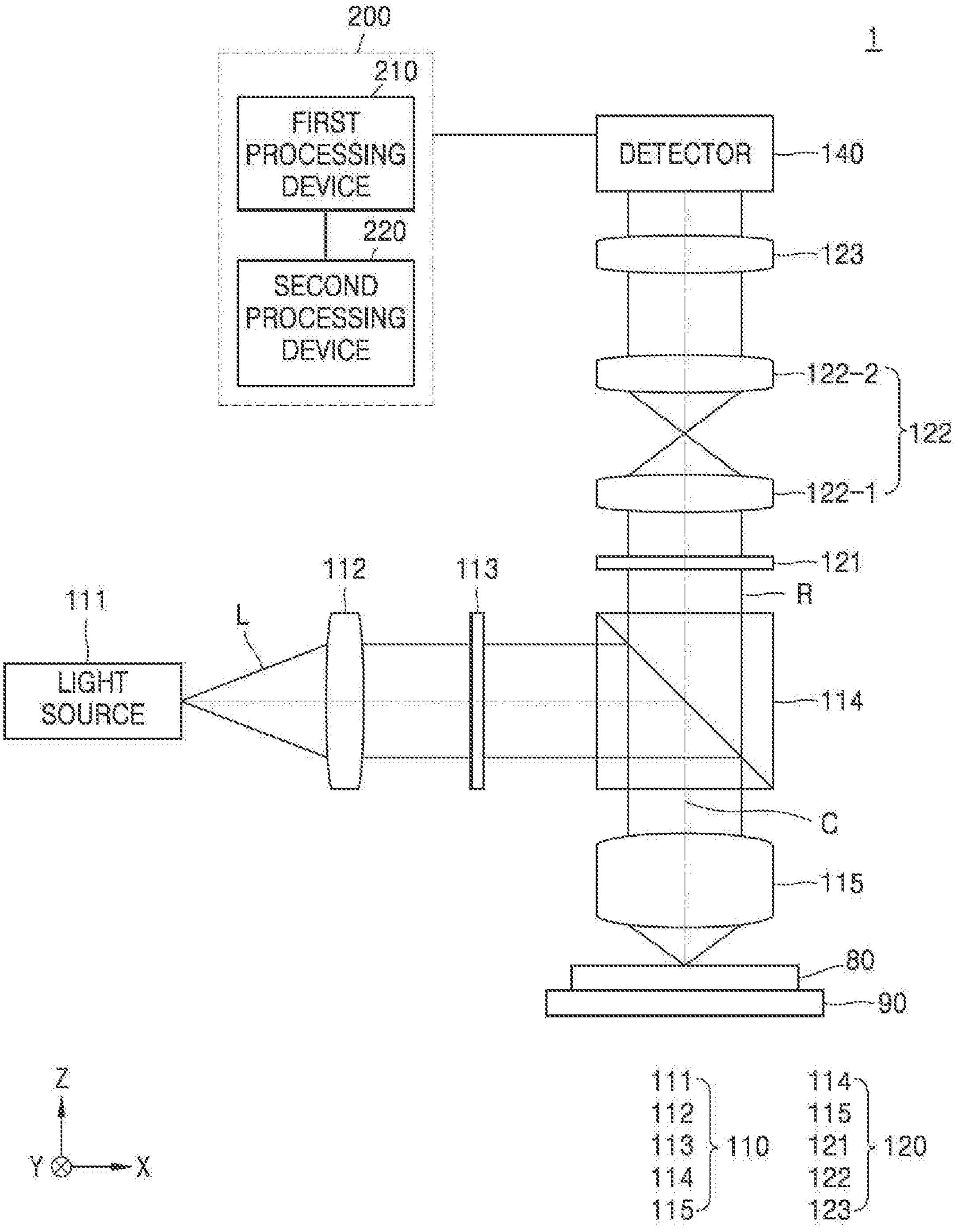
FIG. 2 is a diagram of an apparatus for inspecting and measuring a semiconductor device, according to an example embodiment.
Figure 3:
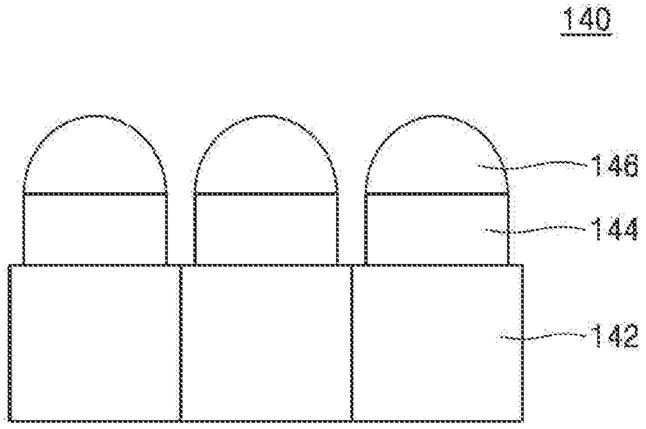
FIG. 3 is a cross-sectional view of a detector according to an example embodiment.

FIG. 1 is a diagram of an apparatus for inspecting and measuring a semiconductor device, according to an example embodiment. FIG. 2 is a diagram of an apparatus for inspecting and measuring a semiconductor device, according to an example embodiment. FIG. 3 is a cross-sectional view of a detector according to an example embodiment.

Referring to FIGS. 1, 2, and 3, an apparatus 1 for inspecting and measuring a semiconductor device of example embodiments may include a stage 90, an illuminating optical system 110, light-condensing optical system 120, an image lens 123, a detector 140, and a processor 200. The apparatus 1 for inspecting and measuring a semiconductor device may obtain a spectral image (e.g., 20 in FIG. 5) by receiving reflected light R from a wafer 80.

The apparatus 1 for inspecting and measuring a semiconductor device according to an embodiment may inspect the wafer 80 using a spectral image sensing method. A light source 111 may radiate incident light L on a measurement region 82 on the wafer 80. A manufacturing process may be performed, and thus, a plurality of regions, for example, chip regions 84 may be formed on the wafer 80. The measurement region 82 may include one chip region 84 or a plurality of chip regions 84 according to an radiated range of incident light L. In another embodiment, the measurement region 82 may be one or more cell regions. The apparatus 1 for inspecting and measuring a semiconductor device according to an embodiment may measure a spectral image for a plurality of positions at a time.

The incident light L, which is radiated on the wafer 80, may be reflected from the measurement region 82 on the wafer 80, and the reflected light R reflected from the measurement region 82 may be incident to the detector 140. The detector 140 may include, for example, a spectral imaging camera. For example, the detector 140 may include a spectral imaging camera using a time delayed integration (TDI) scanning process. The TDI scanning process is described in detail with reference to FIG. 4. The detector 140 may detect a spectral image from reflected light R that is incident thereto. A detailed description thereof is given with reference to FIGS. 5 to 7.

The wafer 80 may include the measurement region 82. The wafer 80 may be, for example, a semiconductor substrate. The semiconductor substrate may include one of strained silicon (Si), a silicon alloy, silicon carbide (SiC), silicon germanium (SiGe), silicon germanium carbide, germanium, a germanium alloy, gallium arsenide (GaAs), indium arsenide (InAs), a III-V semiconductor, and a II-VI semiconductor, a combination thereof, and a laminate thereof. Furthermore, the wafer 80 may not be a semiconductor substrate and may be an organic plastic substrate as needed. The wafer 80 may be positioned on the stage 90.

The stage 90 may support the wafer 80. The stage 90 may fix the position of the wafer 80 or move the wafer 80 to a certain position during the semiconductor process. For example, the stage 90 may be moved in a horizontal direction (X direction and/or Y direction). That is, the stage 90 may move the wafer 80 in a horizontal direction (X direction and/or Y direction).

An XYZ orthogonal coordinate axis system is introduced for convenience of description of the apparatus 1 for inspecting and measuring a semiconductor device of example embodiments. The vertical direction (Z direction) indicates an optical axis C. Two additional directions, which are perpendicular to the vertical direction (Z direction) and are perpendicular to each other, are set as horizontal directions (X direction and/or Y direction).

The illuminating optical system 110 may illuminate a sample with incident light L including linear polarization. The sample may include the wafer 80. The illuminating optical system 110 may include the light source 111, a first lens unit 112, a first polarizer unit (or first polarizer) 113, a beam splitter 114, and an object lens 115.

The light source 111 may generate incident light L. The incident light L, which may be generated by the light source 111, may include broadband light. The incident light L may be, for example, white light. However, the incident light L, which is generated by the light source 111, is not limited to white light. For example, the light source 111 may radiate visible light. The wavelength range of the visible light may be about 400 nm to about 800 nm. However, the disclosure is not limited thereto. The wavelength band of the light source 111 may vary with the object to be measured and may generally have a bandwidth of an ultraviolet (UV) band to a near infrared (NIR) band. The light source 111 may emit light having a certain wavelength or may simultaneously emit light having several wavelengths. For example, the incident light L may include monochromatic light having a certain wavelength, or light having a certain wavelength range. Because sensitivity to the measurement region 82 on the wafer 80 varies depending on the wavelength of the light source 111, the light source 111 may use various wavelength ranges. However, the disclosure is not limited thereto. The incident light L, which is generated by the light source 111, may be incident on the first lens unit 112.

The first lens unit 112 may include, for example, a convex lens. The first lens unit 112 may change the angle distribution of incident light L incident thereto and may radiate the incident light L on the first polarizer unit 113. For example, the first lens unit 112 may convert incident light L, emitted from the light source 111, into parallel light. In addition, the first lens unit 112 may allow incident light L, which is obtained by converting the incident light L into parallel light, to be incident to the first polarizer unit 113.

The incident light L, which is generated by the light source 111, may be incident on the first polarizer unit 113. The first polarizer unit 113 may include, for example, a linear polarizer, which generates linear polarization. Accordingly, the first polarizer unit 113 may transmit incident light L including unidirectional linear polarization. For example, the first polarizer unit 113 may emit incident light L of the linear polarization, in which the polarization direction is tilted by 45 degrees to the ground, to the beam splitter 114.

The beam splitter 114 may reflect part of incident light L incident thereto and transmit part of incident light L incident thereto. The beam splitter 114 may reflect part of the incident light L incident thereto to be directed to the object lens 115. The incident light L reflected from the beam splitter 114 may be incident on the object lens 115.

The object lens 115 may illuminate wafer 80 with incident light L including linear polarization. The object lens 115 may illuminate the wafer 80 by condensing incident light L reflected from the beam splitter 114 in a dotted shape. The object lens 115 may transmit incident light L and may transmit reflected light R from the measurement surface of the wafer 80. In the apparatus 1 for inspecting and measuring a semiconductor device of example embodiments, the optical axis C of incident light L incident on the wafer 80 and the optical axis C of reflected light R from the wafer 80 may be perpendicular to the measurement surface of the wafer 80.

The light-condensing optical system 120 may condense reflected light R from the wafer 80. The light-condensing optical system 120 may include an object lens 115, a beam splitter 114, a second polarizer unit (or second polarizer) 121, a second lens unit 122, and an image lens 123. The beam splitter 114 and the object lens 115 may be a component of the light-condensing optical system 120 as well as a component of the illuminating optical system 110. The beam splitter 114 may transmit part of reflected light R that is incident thereto. For example, the reflected light R, which has passed through the beam splitter 114, may be incident on the second polarizer unit 121. The object lens 115 may transmit reflected light R from the wafer to be incident on the beam splitter 114.

The configuration of the second polarizer unit 121 may be substantially the same as the configuration of the first polarizer unit 113.

The second lens unit 122 may condense reflected light R, which has passed through the beam splitter 114 and the second polarizer unit 121, and allow the condensed reflected light R to be incident on the image lens 123. The second lens unit 122 may include, for example, a lower relay lens 122-1 and an upper relay lens 122-2.

The image lens 123 may adjust chromatic aberration of the reflected light R. The image lens 123 may be between the light-condensing optical system 120 and the detector 140. The image lens 123 has a focal length f. The focal length f may be inversely proportional to the distance between the image lens 123 and the measurement sample and may be proportional to the distance between the image lens 123 and the detector 140.

The detector 140 may detect a spectral image from reflected light R. For example, the detector 140 may detect a spectral image for a certain wavelength. The detector 140 may include a TDI sensor 142 configured to sense reflected light R. Reflected light R incident on the TDI sensor 142 may be vertically incident to the lens surface of the TDI sensor 142. In another embodiment, reflected light R incident on the TDI sensor 142 may be incident at an angle which is not perpendicular to the lens surface of the TDI sensor 142.

For example, the detector 140 may include a TDI spectral imaging camera. The TDI spectral imaging camera may quickly detect the spectral image of the wafer 80. The TDI spectral imaging camera may detect images for a plurality of wavelengths, for single photographing. For example, a wavelength filter 144 may be on the TDI sensor 142. The wavelength filter 144 may be an RGB filter. In addition, a focusing lens 146 may be on the wavelength filter 144. The focusing lens 146 may control the reflected light R to allow reflected light R to be formed on the TDI sensor 142. According to an embodiment, the apparatus 1 for inspecting and measuring a semiconductor device may include only one of the image lens 123 and the focusing lens 146.

According to an embodiment, the detector 140 may receive first to third spectral images respectively corresponding to a first wavelength, a second wavelength, and a third wavelength. The first wavelength, the second wavelength, and the third wavelength may correspond to blue color, green color, and red color, respectively. For example, the first wavelength may be about 450 nm to about 490 nm, the second wavelength may be about 495 nm to about 570 nm, and the third wavelength may be about 630 nm to about 750 nm.

An example of detection of three different wavelengths by the detector 140 is described, but the number of wavelengths detected by the detector 140 is not limited thereto. For example, the detector 140 may detect two or more different wavelengths.

The processor 200 may receive a spectral image (e.g., 20 of FIG. 5) from the detector 140. The processor 200 may generate a spectral matrix (e.g., 30 of FIG. 6) using the received spectral image (e.g., 20 of FIG. 5). For example, the processor 200 may receive a first spectral image corresponding to the first wavelength, and a second spectral image corresponding to the second wavelength that is different from the first wavelength, from the detector 140, and may generate a spectral matrix (e.g., 30 of FIG. 6) using the first and second spectral images. However, the disclosure is not limited thereto.

Specifically, the processor 200 may include a first processing device 210 and a second processing device 220. However, the disclosure is not limited thereto. Although it is illustrated in FIG. 2 that the processor 200 includes the first processing device 210 and the second processing device 220, the first processing device 210 and the second processing device 220 may be implemented as separate processor components (e.g., separate processors).

The first processing device 210 may convert the first and second spectral images detected by the detector 140 into a spectral matrix (e.g., 30 of FIG. 6) and store the spectral matrix. Details about the spectral matrix (e.g., 30 of FIG. 6) are described below. The first processing device 210 may generate a spectrum (e.g., 40 of FIG. 7) indicating the change of intensity (amount of light) according to the wavelength of each pixel in a measurement sample using the spectral matrix (e.g., 30 of FIG. 6). The first processing device 210 may be connected to the second processing device 220, and when there is a request from the second processing device 220, an operation of generating the spectrum (e.g., 40 of FIG. 7) may be performed. The first processing device 210 may be configured as a data readout computing device, but the disclosure is not limited thereto.

Figure 6:
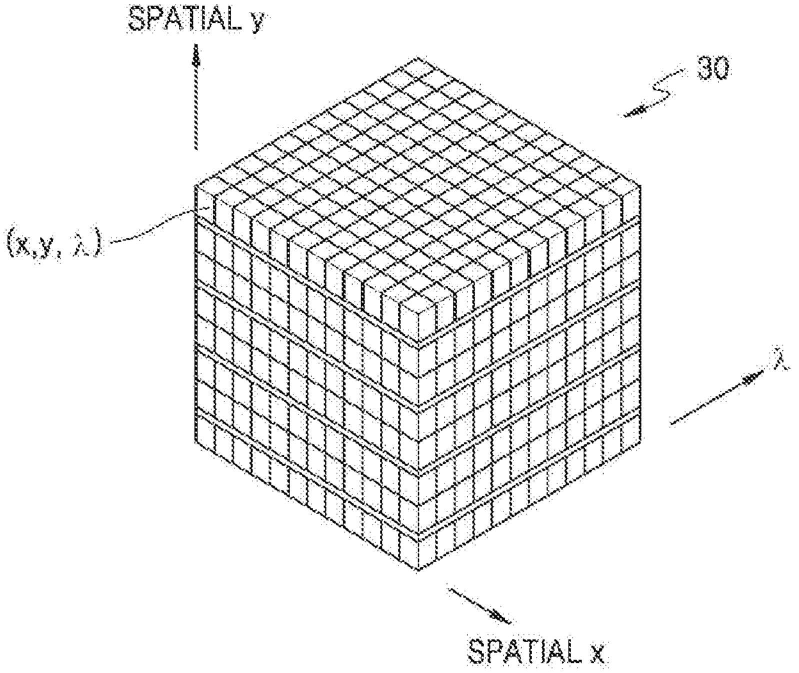
FIG. 6 is a diagram illustrating a spectral matrix according to an example embodiment.

In another embodiment, the first processing device 210 may generate a spectrum indicating a change in the ratio of intensity according to the wavelength of each pixel in a measurement sample using the spectral matrix (e.g., 30 of FIG. 6).

The second processing device 220 may analyze the spectrum (e.g., 40 of FIG. 7) generated by the first processing device 210 and may select the wavelength band of the optimal condition for the measurement variable. The second processing device 220 may be configured as a data analyzer. The second processing device 220 may extract physical parameters of the inspection region of the wafer 80, from spectrum data. The second processing device 220 may execute a parameter separation algorithm, such as a correlation analysis algorithm or a main component analysis algorithm, for extracting a profile change value from a plurality of spectra. This will be described in detail below.

Measurement variables, which may be measured by the apparatus 1 for inspecting and measuring a semiconductor device, may include a critical dimension, a height of a pattern, a recess, an overlay, a material, and/or a defect.

The apparatus 1 for inspecting and measuring a semiconductor device according to an embodiment may determine a wavelength band most sensitive to the measurement variable to be measured. The apparatus 1 for inspecting and measuring a semiconductor device may obtain the wavelength band of the optimal condition for each measurement variable and may quickly determine whether there is a change in the value of the measurement variable by utilizing the wavelength band in monitoring the measurement variable.

In the apparatus 1 for inspecting and measuring a semiconductor device of example embodiments, the detector 140 may include a spectral camera and/or a TDI spectral camera and may detect a two-dimensional space spectral image without rotating a polarimeter and/or optical devices of the apparatus 1 for inspecting and measuring a semiconductor device. Therefore, the apparatus 1 for inspecting and measuring a semiconductor device may quickly detect the two-dimensional space spectral image. In addition, the apparatus 1 for inspecting and measuring a semiconductor device may obtain more information for the same number of times of performing sample photographing by including a TDI spectral camera and implementing a TDI scanning process.

Figure 4:
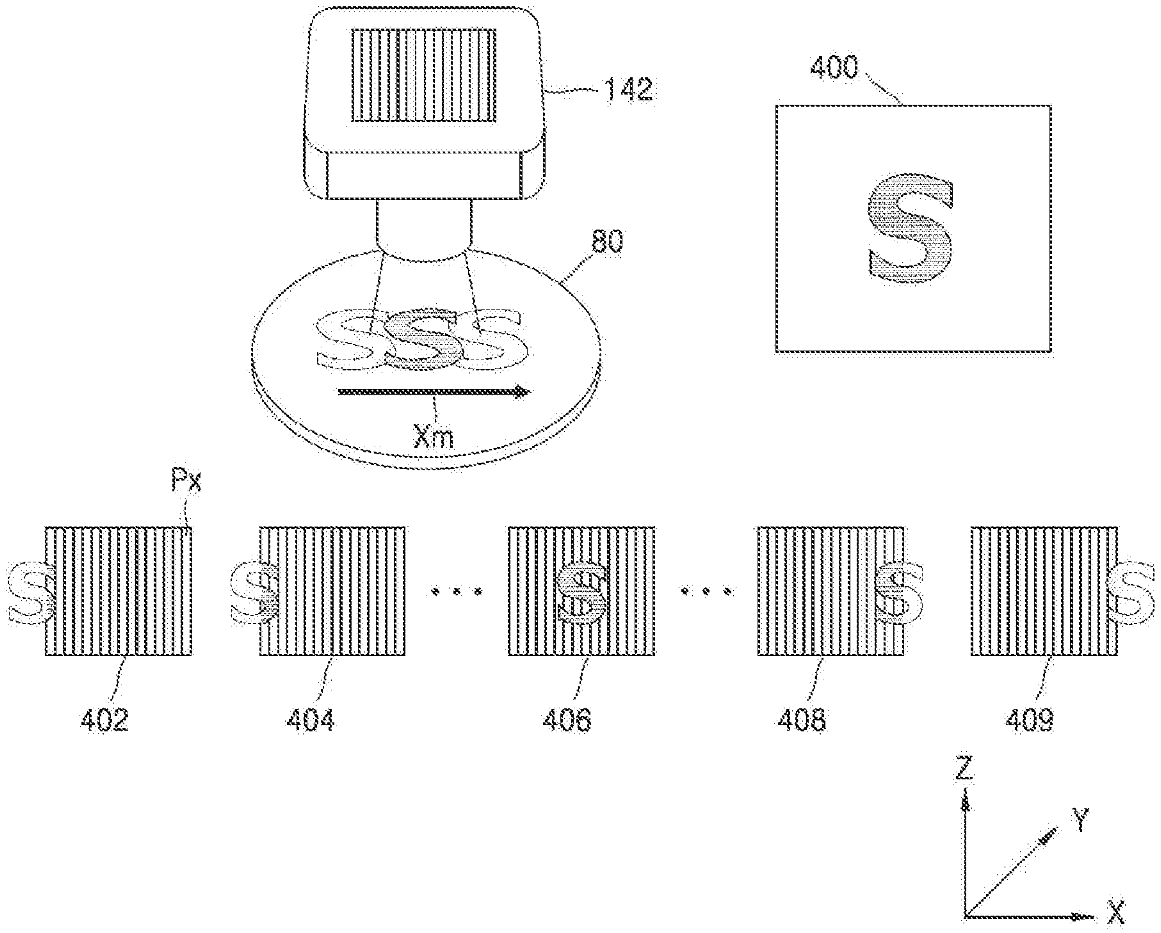
FIG. 4 is a diagram of a time delayed integration (TDI) scanning process used in an apparatus for inspecting and measuring a semiconductor device, according to an example embodiment.

FIG. 4 is a diagram of a TDI scanning process used in an apparatus for inspecting and measuring a semiconductor device, according to an example embodiment. FIG. 4 illustrates only a TDI sensor 142 of the detector (e.g., 140 of FIG. 2), and a wafer 80, which is an inspection object, for convenience of description.

FIG. 4 illustrates a TDI scanning process. In the TDI scanning process, the wafer 80 is continually moved without stopping, but a plurality of patterns may be photographed at regular time intervals using the TDI sensor 142 including pixels in the form of multiple lines. The TDI sensor 142 may obtain a clear image by overlapping images obtained through each photographing operation. In the TDI scanning process, the same pattern is photographed for each photographing operation. Accordingly, the pattern of the rear pixel portions is photographed later than the front line pixel Px portions according to the moving speed of the object. In the TDI scanning process, the same pattern is photographed multiple times, and a clear image is obtained by overlapping the generated photographs. Accordingly, synchronizing the photographing speed of the TDI sensor 142 with the moving speed of the inspection object may be performed. The moving direction Xm, may indicate the scanning direction. In addition, photographs 402, 404, 406, 408 and 409 show consecutive photographing of the pattern 400 in the photographing region including a plurality of line pixels Px. The wafer 80 may be moved in a horizontal direction (X direction and/or Y direction) by the horizontal direction (X direction and/or Y direction) movement of the stage (e.g., stage 90).

In the case of a line scanning charge-coupled device (CCD) sensor, the exposure time may be short. Accordingly, high intensity illumination is required, and the line scanning CCD sensor may be difficult to be applied to high-speed applications. In contrast, the TDI sensor 142 may use illumination having an intensity less than that of the line scanning CCD sensor, and may also be applied to a high-speed application to which the line scanning CCD sensor may not be applicable.

Figure 5:
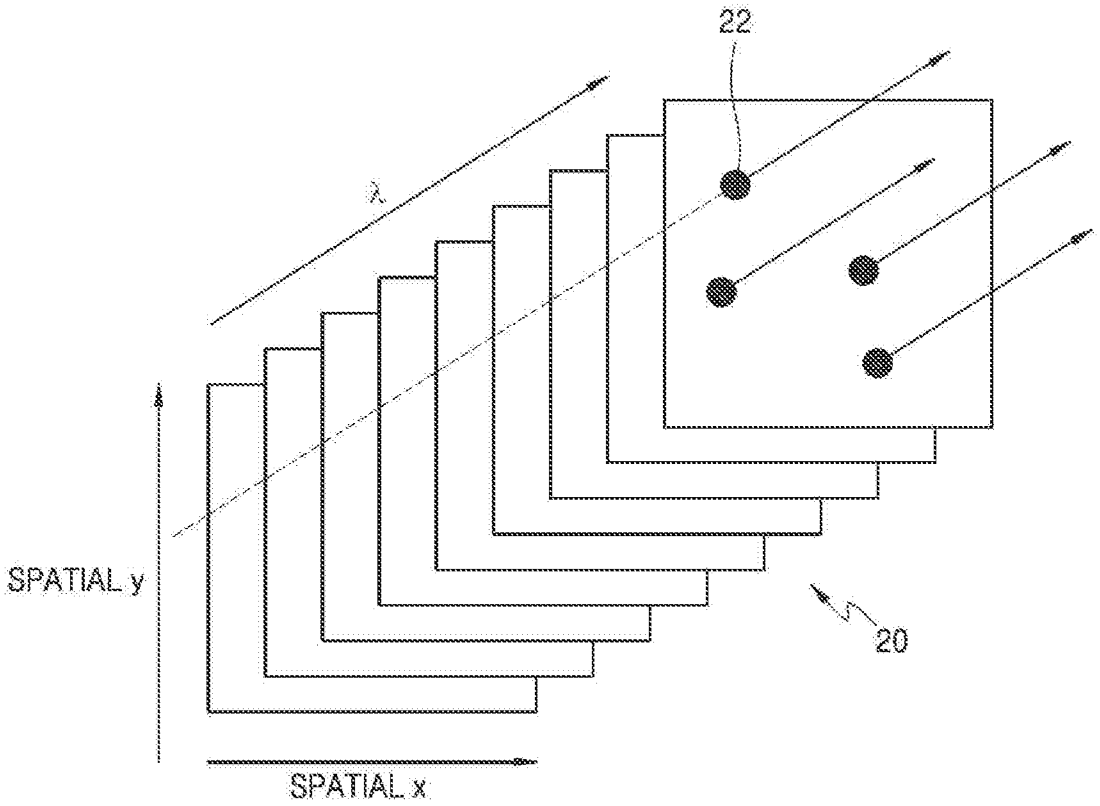
FIG. 5 is a diagram illustrating a spectral image for a wavelength according to an example embodiment.

FIG. 5 is a diagram illustrating a spectral image for a wavelength according to an example embodiment. FIG. 6 is a diagram illustrating a spectral matrix according to an example embodiment.

Referring to FIGS. 5 and 6, each spectral image 20 may be measured for each of a plurality of wavelengths. The spectral image 20 may be composed of data for the spatial axis X and the spatial axis Y. Each spectral image 20 corresponding to the wavelength may be measured. For example, n spectral images 20 may be measured for n wavelengths λ.

A spectral matrix 30 may be generated by the processor 200 using a plurality of spectral images 20. However, the disclosure is not limited thereto, and the spectral matrix 30 may be obtained in the detector 140 by measuring reflected light R in the detector 140, and the spectral matrix 30, which may be output from the detector 140, may be stored in a memory of the first processing device 210 of the processor 200.

The spectral matrix 30 may refer to a virtual spectral data structure obtained through the pixel resampling process of a spatial area and a spectrum area. The spectral matrix 30 may be referred to as a spectral cube. As shown in FIG. 5, the spectral matrix 30 may include spatial axes including the spatial axis X and the spatial axis Y, and the width may include a plurality of spectral images 20 according to the wavelength λ. That is, the spectral matrix 30 may be composed of data in the form of a spectral cube having the spatial axis X, the spatial axis Y and the wavelength λ for the pixel array of the measurement sample as coordinate axes.

The spectral matrix 30 may be represented by I (x, y, λ) as coordinates. The spectral image 20 may be referred to as a spectral domain. The spectral matrix 30 may include spectral images 20 having spatial axes of each measurement sample 22 photographed by the field of view (FOV) of an optical sensor included in the detector 140, and the spectrum of each measurement sample 22 according to the wavelength. That is, the spectral matrix 30 may include a plurality of spectral images 20, and spectra indicating the change in intensity according to the wavelength in respective measurement samples 22 of the spectral images 20.

The measurement sample 22 may include a plurality of pixels. For example, a horizontal width of each of the pixels of the measurement sample 22 may be about 40 nm or more.

The intensity of the reflected light R from the measurement sample 22 may be determined as a representative value of the intensity of the reflected light R from each of the plurality of pixels. The representative value may include an average value, a mode, the highest value, the lowest value, and/or a median value of the intensity of the reflected light R from each of the plurality of pixels.

Figure 7:
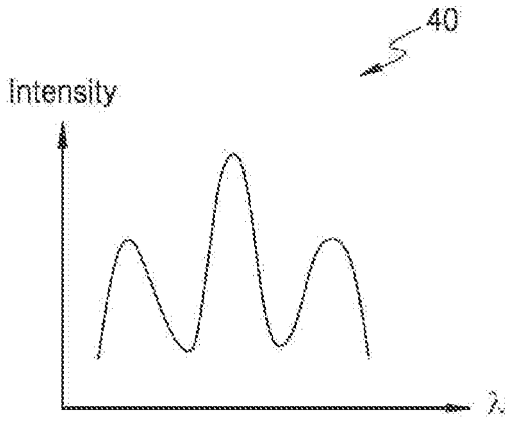
FIG. 7 is a diagram illustrating a spectrum indicating a change in the amount of light according to the wavelength of reflected light of spectral images according to one pixel, according to an embodiment.

FIG. 7 is a diagram illustrating a spectrum indicating a change in the amount of light according to the wavelength of reflected light of spectral images according to one pixel, according to an embodiment. That is, FIG. 7 is a diagram of a spectrum indicating a change in intensity according to the wavelength of reflected light R of spectral images 20 according to one pixel. In FIG. 7, the Y-axis represents intensity, and the X-axis represents wavelength.

Referring to FIGS. 2 to 7, the second processing device 220 may execute a parameter separation algorithm, such as a correlation analysis algorithm or a main component analysis algorithm, for extracting a profile change value from a plurality of spectra.

Figure 15:
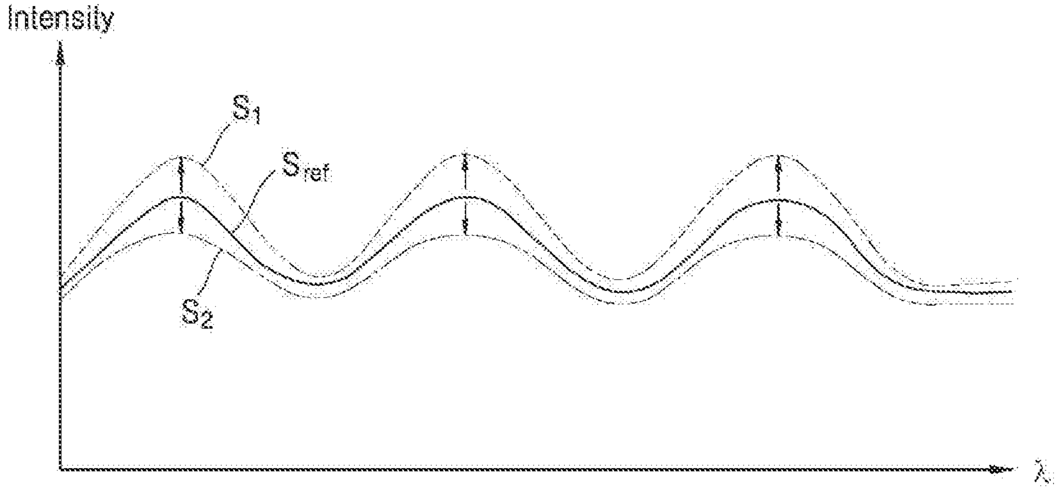
FIG. 15 is a graph showing results of execution of a correlation analysis algorithm, according to an example embodiment.

The correlation analysis algorithm may be executed to measure the similarity between the spectrum (e.g., $S_1$ and $S_2$ of FIG. 15) extracted from the spectral matrix 30, and an ideal spectrum value (e.g., $S_{ref}$ of FIG. 15). The ideal spectrum value (e.g., $S_{ref}$ of FIG. 15) may correspond to a value predetermined by a user for a measurement sample (e.g., 22 of FIG. 2). That is, the measurement sample 22 may be designated by the user to satisfy the ideal spectrum value (e.g., $S_{ref}$ of FIG. 15). The measurement sample 22 may be changed according to the measurement variable, which is being measured. However, the disclosure is not limited thereto, and a plurality of measurement variables may be handled by one measurement sample.

The main component analysis algorithm may be executed to first select the wavelength band in which the displacement of the measurement variable is the largest within the extracted spectrum 40. If various measurement variables show the optimal sensitivity in the same conditions, for the selected wavelength band, independent final conditions for respective measurement variables may be selected by finely readjusting the conditions.

If the wavelength band of the selected optimal condition is used, spectral images for other wafers 80 may be measured, and the local distribution and defects, etc., for the measurement variable of each of profiles within the image may be detected at a high speed.

Figure 8:
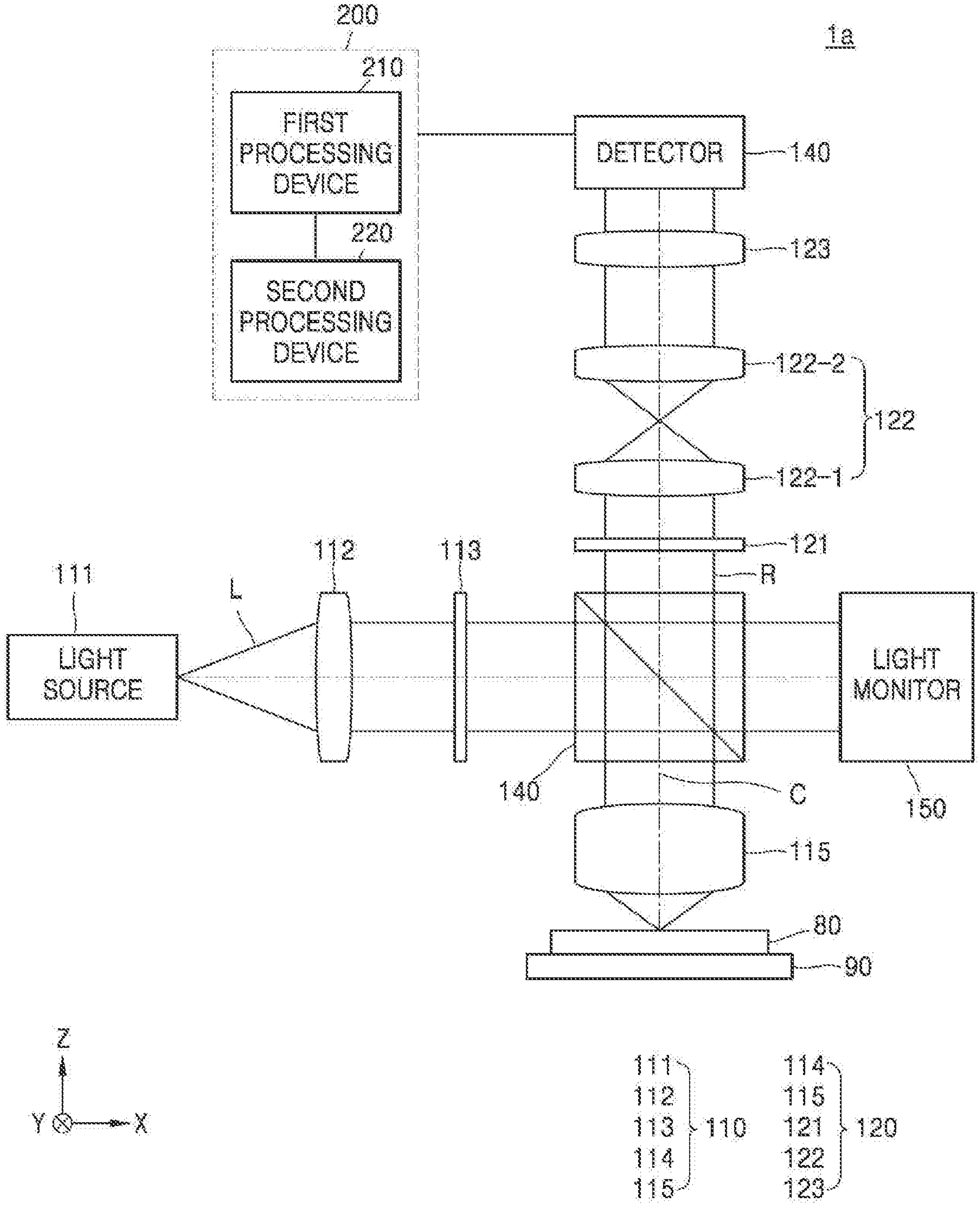
FIG. 8 is a diagram of an apparatus for inspecting and measuring a semiconductor device, according to an example embodiment.

FIG. 8 is a schematic construction view of an apparatus for inspecting and measuring a semiconductor device, according to an embodiment.

Referring to FIG. 8, an apparatus 1*a* for inspecting and measuring a semiconductor device may include a wafer 80, a stage 90, an illuminating optical system 110, a light-condensing optical system 120, an image lens 130, a detector 140, a light monitor 150, and a processor 200. The wafer 80, the stage 90, the illuminating optical system 110, the light-condensing optical system 120, the image lens 130, the detector 140, and the processor 200 of the apparatus 1*a* for inspecting and measuring a semiconductor device may be substantially and respectively the same as the wafer 80, the stage 90, the illuminating optical system 110, the light-condensing optical system 120, the image lens 130, the detector 140, and the processor 200 of the apparatus 1 for inspecting and measuring a semiconductor device of FIG. 2. Therefore, only the light monitor 150 is described here.

The light monitor 150 may calculate the intensity of incident light L, which has passed through the beam splitter 114. The light monitor 150 may determine whether the light source 111 normally operates, by monitoring the intensity of incident light L.

Figure 9:
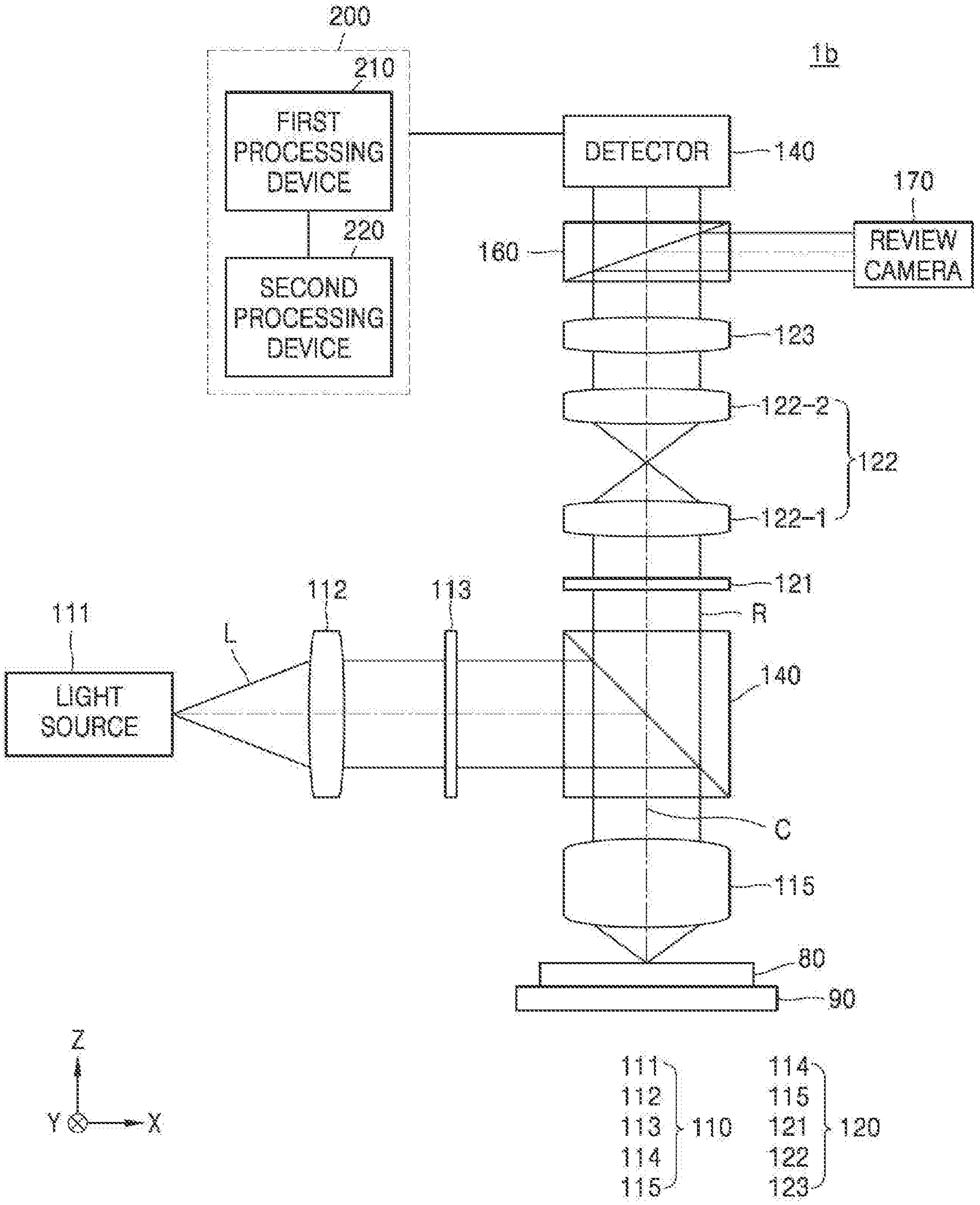
FIG. 9 is a diagram of an apparatus for inspecting and measuring a semiconductor device, according to an example embodiment.

FIG. 9 is a diagram of an apparatus for inspecting and measuring a semiconductor device, according to an example embodiment.

Referring to FIGS. 1 and 9, an apparatus 1*b* for inspecting and measuring a semiconductor device may include a wafer 80, a stage 90, an illuminating optical system 110, a light-condensing optical system 120, an image lens 130, a detector 140, a circulator 160, a review camera 170, and a processor 200. The wafer 80, the stage 90, the illuminating optical system 110, the light-condensing optical system 120, the image lens 130, the detector 140, and the processor 200 of the apparatus 1*b* for inspecting and measuring a semiconductor device may be substantially and respectively the same as the wafer 80, the stage 90, the illuminating optical system 110, the light-condensing optical system 120, the image lens 130, the detector 140, and the processor 200 of the apparatus 1 for inspecting and measuring a semiconductor device of FIG. 2. Therefore, only the circulator 160 and the review camera 170 are described here.

The circulator 160 may transmit part of reflected light R that is incident thereto. For example, part of reflected light R, which has passed through the circulator 160, may be incident on the detector 140, and part of the reflected light R, which has passed through the circulator 160, may be incident on the review camera 170. The circulator 160 may be between the detector 140 and the light-condensing optical system 120.

The review camera 170 may provide an image, which allows an observer to identify the measurement region 82 of the wafer 80 with the naked eye. The image, which may be identified with the naked eye, may be referred to as a review image. Therefore, the apparatus 1*b* for inspecting and measuring a semiconductor device may simultaneously provide the spectral image and the review image.

Figure 10:
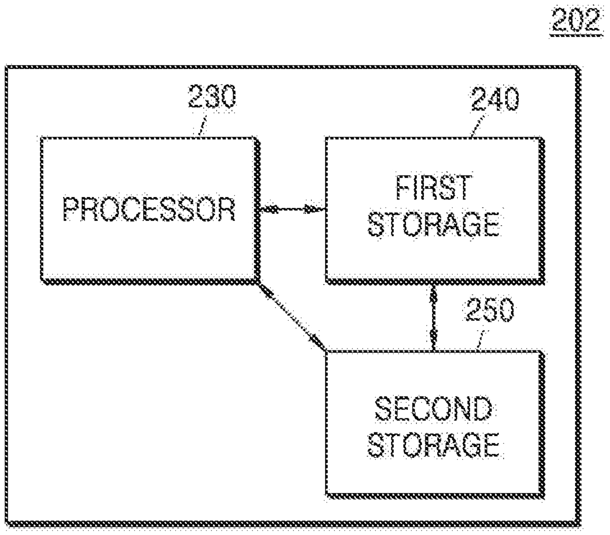
FIG. 10 is a block diagram of a data analysis device according to an example embodiment.

FIG. 10 is a block diagram of a data analysis device according to an example embodiment.

Hereinafter, the data analysis device is described with reference to FIGS. 1 to 9 as well as FIG. 10. Referring to FIG. 10, a data analysis device 202 according to an embodiment may include a processor 230, a first storage 240, and a second storage 250.

The processor 230 may perform certain calculations or tasks. Here, the second processing device 220 according to the embodiments described above may be included in the processor 230. In some embodiments, the processor 230 may be a micro-processor or a central processing unit (CPU).

The processor 230 may communicate with the first storage 240 and the second storage 250 through an address bus, a control bus, and a data bus. In some embodiments, the processor 230 may also be connected to an expansion bus, such as a peripheral component interconnect (PCI) bus.

The first storage 240 and the second storage 250 may store data necessary for the operation of the data analysis device 202. For example, the first storage 240 and the second storage 250 may include dynamic random access memory (DRAM), mobile DRAM, static RAM (SRAM), parameter RAM (PRAM), ferroelectric RAM (FRAM), resistive RAM (RRAM), magnetoresistive RAM (MRAM), or other volatile memory devices. The first storage 240 and the second storage 250 may include a solid state drive (SSD), a hard disk drive (HDD), a compact disc read-only memory (CD-ROM), or other non-volatile memory devices.

The first storage 240 may receive input data. For example, the first storage 240 may receive input data from the detector 140. The input data may include a spectral matrix 30. The spectral matrix 30 may be generated using a first spectral image corresponding to a first wavelength, a second spectral image corresponding to a second wavelength which is different from the first wavelength, and a third spectral image corresponding to a third wavelength. The first storage 240 may store a data analysis module that derives a wavelength band of the optimal condition to the measurement variable using the processor 230.

The deriving of the wavelength band to the measurement variable may include deriving the spectrum 40 indicating the change in intensity according to the wavelength of each pixel in a measurement sample using the spectral matrix 30, and selecting the wavelength band of the optimal condition for the measurement variable using the spectrum 40.

Selecting the wavelength band of the optimal condition for the measurement variable may include selecting the wavelength band of the optimal condition based on execution of a correlation analysis algorithm, which is executed to measure the similarity between the spectrum 40 extracted from the spectral matrix 30, and a value predetermined for the measurement variable, or based on execution of a main component analysis algorithm, which is executed to select the wavelength band in which the largest displacement of the measurement variable is shown in the spectrum 40.

The second storage 250 may store the input data. The input data stored in the second storage 250 may be provided to the data analysis module stored in the first storage 240. The data analysis device 202 may be electrically connected to a spectral detector including the detector 140. The data analysis method of the data analysis device 202 described above may be stored in a recording medium having a program stored therein. However, the disclosure is not limited thereto.

Figure 11:
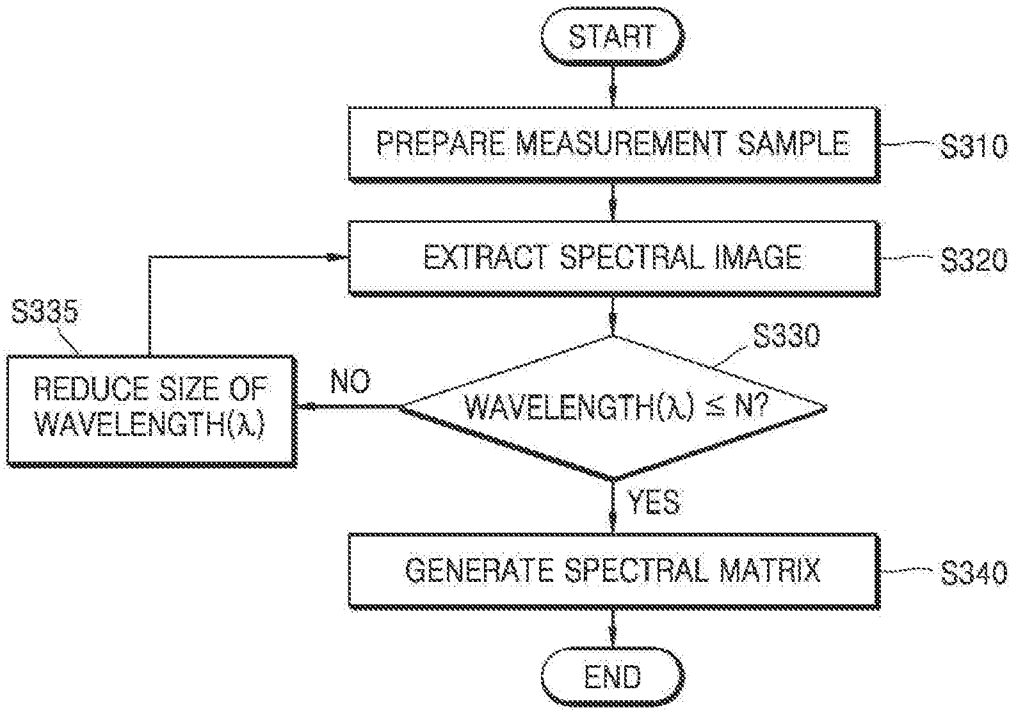
FIG. 11 is a flowchart of a method of generating a spectral image cube for a measurement sample, according to an example embodiment.

FIG. 11 is a flowchart of a method of generating a spectral image cube for a measurement sample, according to an example embodiment.

Hereinafter, the method is also described with reference to FIGS. 1 to 10. Referring to FIG. 11, in the method of generating a spectral image cube according to an embodiment, in operation S310, a measurement sample 22 may be prepared. In the measurement sample 22, a predetermined value may be set for the measurement variable. The measurement variable may include a critical dimension, a height, a recess, an overlay, a material, and/or a defect. For example, the measurement sample 22 may be formed as a pattern having multiple heights, and a user may have information (e.g., a spectrum) on each of the heights before measurement.

In operation S320, a spectral image may be extracted. Specifically, a first spectral image corresponding to a first wavelength, a second spectral image corresponding to a second wavelength which is different from the first wavelength, and a third spectral image corresponding to a third wavelength may be extracted from the reflected light R.

In operation S330, it may be determined whether the size of the detected wavelength is less than a predetermined value N. For example, the predetermined value N may be 800 nm.

If the size of the wavelength is greater than the predetermined value N (No at operation S330), in operation S335, the size of the wavelength may be reduced, and another spectral image is then extracted (e.g., operation S320 may be repeated).

In contrast, when the size of the wavelength is less than the predetermined value N (Yes at operation S330), in operation S340, a spectral matrix may be generated using the measured spectral image. Accordingly, a spectral image corresponding to the wavelength having a size less than N may be extracted.

In addition, a spectral matrix may be formed by repeating operations S310 to S340.

Figure 12:
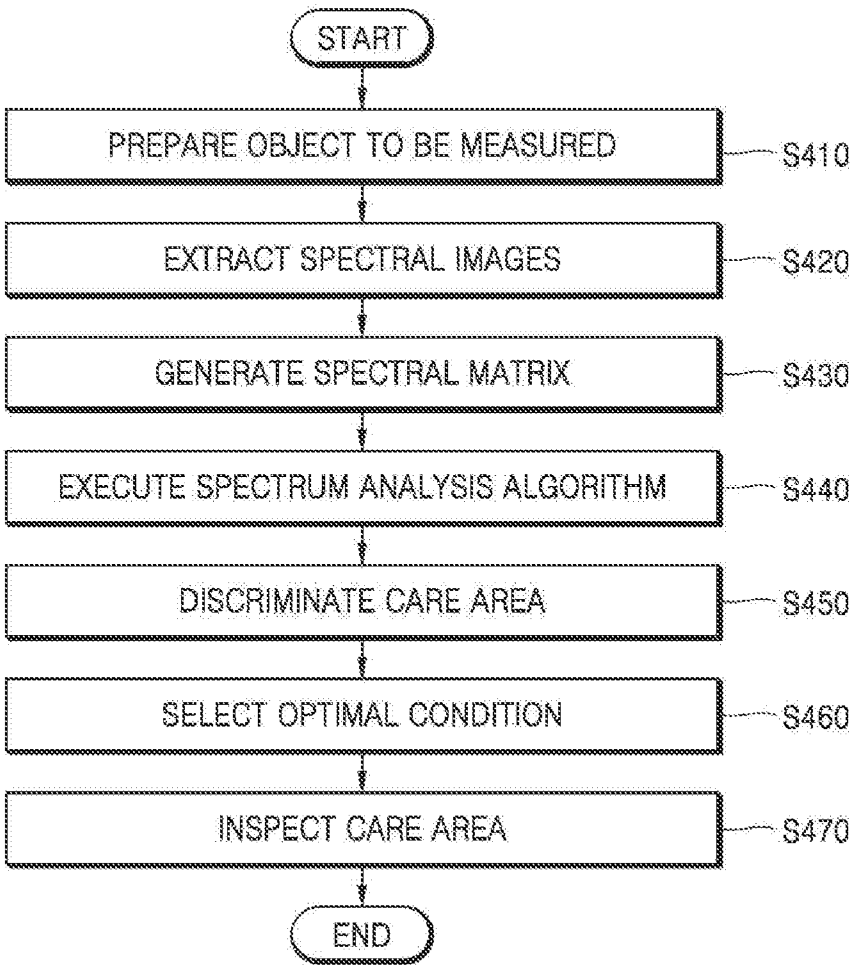
FIG. 12 is a flowchart of a method of inspecting and measuring a semiconductor device, according to an example embodiment.

FIG. 12 is a flowchart of a method of inspecting and measuring a semiconductor device, according to an example embodiment.

Hereinafter, the method is also described with reference to FIGS. 1 to 11. Referring to FIG. 12, in operation S410, an object to be measured may be prepared. For example, the object to be measured may include the wafer 80. In operation S420, a plurality of spectral images 20 of the object to be measured may be extracted. In operation S430, a spectral matrix 30 may be generated using the plurality of spectral images 20. Operations S410 to S430 may be performed in substantially the same manner as in operations S310 to S340.

In operation S440, a spectrum analysis algorithm may be executed. The spectrum analysis algorithm may be executed by the processor 200 or the data analysis device 202. Specifically, a spectrum 40 indicating a change in intensity according to the wavelength of each pixel in a measurement sample may be generated using the spectral matrix. The intensity may include an average value, a mode, the highest value, the lowest value, and/or a median value of the intensity of the reflected light R according to the wavelength of each pixel in a measurement sample. In another embodiment, a spectrum 40, which indicates the change in the ratio of the intensity according to a plurality of wavelengths, may be generated.

In operation S450, a care area may be discriminated. When the difference between the spectrum extracted from the spectral matrix 30, and the value $S_{ref}$ predetermined for the measurement variable is greater than the care area discrimination threshold value, the region, in which the chip regions 84 of the wafer 80 are arranged, may be discriminated as the care area (e.g., CA of FIG. 19A), based on execution of the main component analysis algorithm and/or the correlation analysis algorithm.

In operation S460, the wavelength band of the optimal condition for the measurement variable may be selected. Precise measurement for the care area (may be performed by changing sensitivity to a certain wavelength. That is, precise measurement for the care area may be performed by changing the care area inspection threshold value for a certain wavelength range.

In operation S470, the care area may be inspected. For example, the care area may be inspected by measuring the change in the intensity while changing the wavelength band of the extracted spectrum 40. In another embodiment, the care area may be inspected by additionally extracting a plurality of spectral images 20 for the wafer 80, and then generating a spectral matrix 30 and performing a spectrum analysis algorithm on the spectral matrix 30.

For the same measurement variable, the care area inspection threshold value may be different for different care areas. For example, a region in which the care area inspection threshold value is relatively small may be a weak region, and a region in which the care area inspection threshold value is relatively large may be a stable region. That is, closer inspection may be performed for the weak region. The weak region and the stable region may be determined by the intensity according to the wavelength or the ratio of the intensity according to a plurality of wavelengths.

When the difference between the spectrum 40 and the value $S_{ref}$ predetermined for the measurement variable is greater than the inspection threshold value, it may be determined that there is a defect in the region where chip regions 84 of the wafer 80 are arranged, using the main component analysis algorithm.

The care area discrimination threshold value may be used when discriminating the care area, and the care area inspection threshold value may be used when inspecting the care area. The care area discrimination threshold value may be different for different care areas, for the same measurement variable. In addition, the care area inspection threshold value may be different for different care areas, for the same measurement variable. In addition, for the same measurement variable, the care area discrimination threshold value may be different from the care area inspection threshold value.

Figure 13:
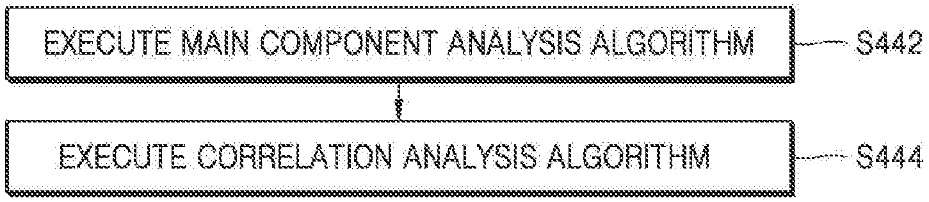
FIG. 13 is a flowchart of a method of executing a spectrum analysis algorithm, according to an example embodiment.
Figure 14:
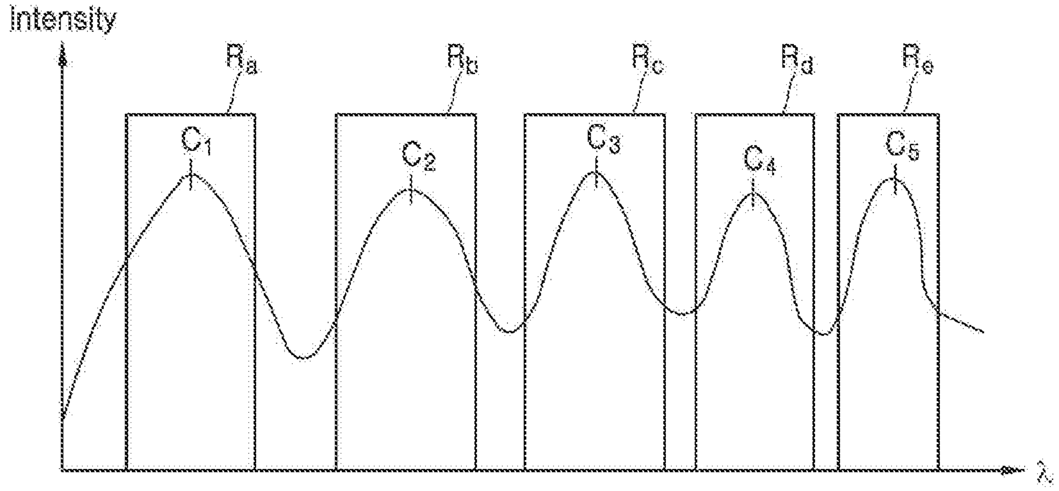
FIG. 14 is a graph showing results of execution of a main component analysis algorithm, according to an example embodiment.

FIG. 13 is a flowchart of a method of executing a spectrum analysis algorithm. FIG. 14 is a graph showing results of execution of a main component analysis algorithm, according to an example embodiment. FIG. 15 is a graph showing results of execution of a correlation analysis algorithm, according to an example embodiment.

Referring to FIGS. 12 and 13, operation S440 of executing the spectrum analysis algorithm may include operation S442 of executing a main component analysis algorithm and operation S444 of executing a correlation analysis algorithm. Although it is illustrated in FIG. 13 that operation S442 and operation S444 are sequentially performed, the disclosure is not limited thereto. The order of operation S442 and operation S444 may be changed, or operation S442 and operation S444 may be simultaneously performed.

Referring to FIG. 14, the main component analysis algorithm may be executed for selecting the wavelength band in which the displacement of the measurement variable is the largest within the spectrum 40. The spectrum 40 of FIG. 14 may have multiple peak values $C_1$ to $C_5$, and each of the peak values $C_1$ to $C_5$ may indicate the main component of the measurement variable. Accordingly, the main component analysis algorithm may be executed to select the optimal wavelength band by determining the band (Ra to Re) at which the main component most sensitive to the measurement variable is located in the wavelength band of the spectrum 40.

Referring to FIGS. 5, 6, and 15, the correlation analysis algorithm may be executed to measure the similarity between the spectrum extracted from the spectral matrix 30, and the value $S_{ref}$ predetermined for the measurement variable. For each measurement variable, a user may have a predetermined ideal spectrum value $S_{ref}$. That is, the measurement sample 22 may be manufactured by the user to satisfy the ideal spectrum value $S_{ref}$. In addition, the measurement sample 22 may be changed according to the measurement variable, which is desired to be measured.

Therefore, the spectrum 40 most sensitive to the measurement variable may be selected by measuring the similarity between the spectrum extracted from the spectral matrix 30, and the value $S_{ref}$ predetermined for the measurement variable. In another embodiment, accurate measurement for some care areas may be performed by changing the sensitivity to a certain wavelength. That is, accurate measurement for some care areas may be performed by changing the threshold value for a certain wavelength range.

That is, according to the method of inspecting and measuring a semiconductor device of example embodiments, care areas may be discriminated using the spectral image 20 and the spectral matrix 30, measurement values (e.g., used wavelength band and/or threshold value), etc., may be changed for the discriminated care areas, and the semiconductor device may be quickly and accurately inspected.

Figure 16A:
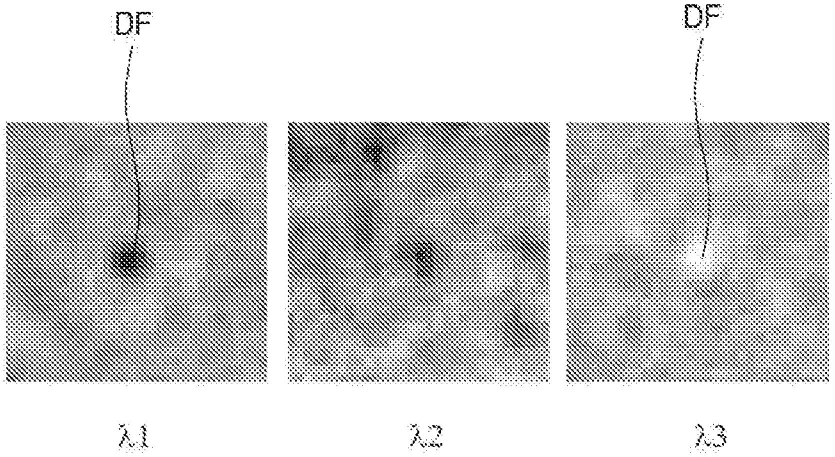
FIGS. 16A and 16B are diagrams illustrating the effects of an apparatus for inspecting and measuring a semiconductor device, according to an example embodiment.
Figure 16B:
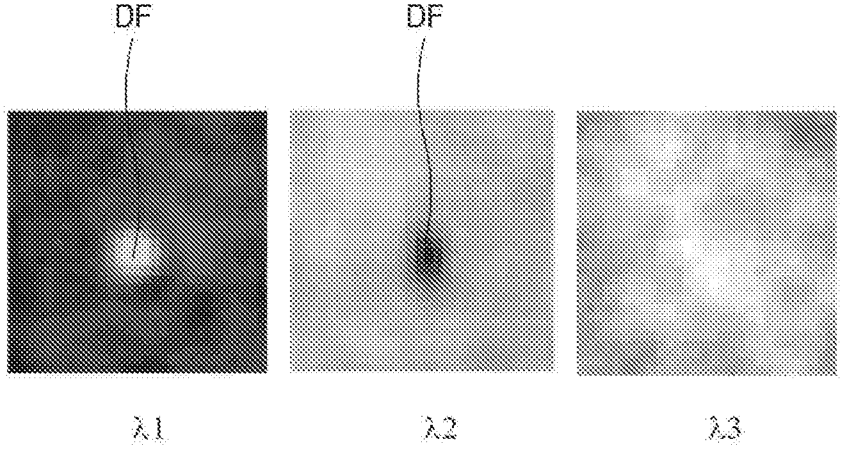

FIGS. 16A and 16B are diagrams illustrating the effects of an apparatus for inspecting and measuring a semiconductor device, according to an example embodiment.

Referring to FIGS. 1, 16A and 16B, the apparatus 1 for inspecting and measuring a semiconductor device may effectively detect a defect using a plurality of wavelengths. FIGS. 16A and 16B show the result of photographing the measurement region 82 of the wafer 80, which includes two kinds of arbitrary defects, using three different wavelengths.

Referring to FIG. 16A, the apparatus 1 for inspecting and measuring a semiconductor device may detect a defect DF when photographing the measurement region 82 of the wafer 80 with wavelength λ1 and/or wavelength λ3, but the apparatus 1 for inspecting and measuring a semiconductor device may not be able to detect a defect DF when photographing the measurement region 82 of the wafer 80 with wavelength λ2.

Referring to FIG. 16B, the apparatus 1 for inspecting and measuring a semiconductor device may detect a defect DF when photographing the measurement region 82 of the wafer 80 with wavelength λ1 and/or wavelength λ2, but the apparatus 1 for inspecting and measuring a semiconductor device may not be able to detect a defect DF when photographing the measurement region 82 of the wafer 80 with wavelength λ3. Therefore, the apparatus 1 for inspecting and measuring a semiconductor device may effectively detect various kinds of defects when photographing the wafer 80 using a plurality of wavelengths.

Figure 17:
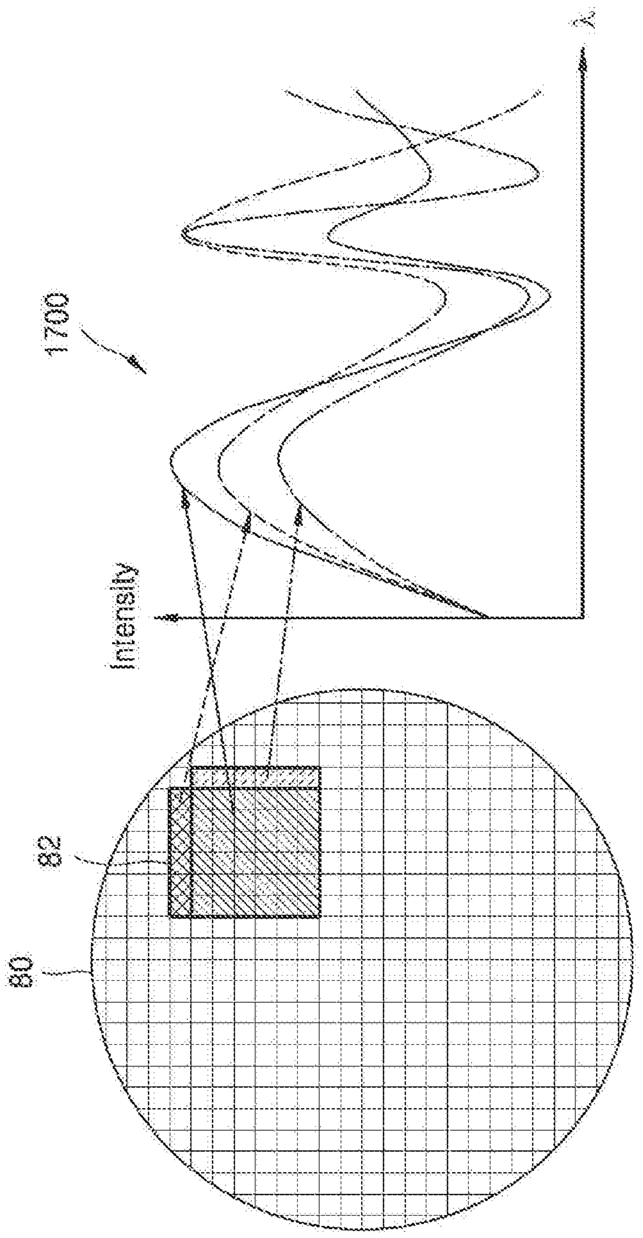
FIG. 17 is a diagram illustrating the amount of light according to a wavelength for each measurement region of a wafer, according to an example embodiment.
Figure 18A:
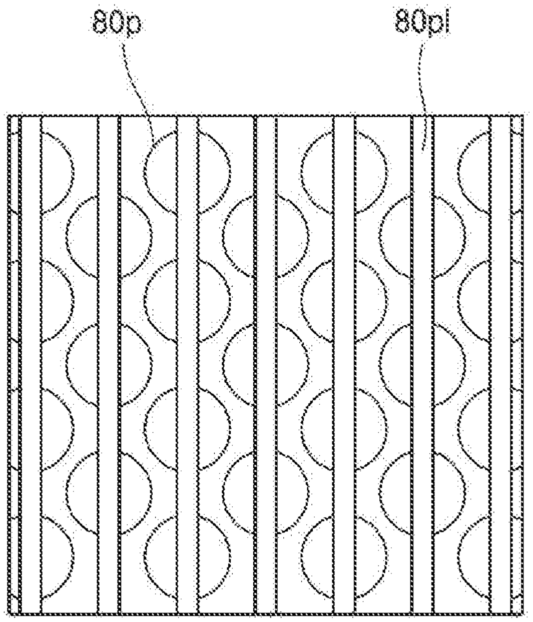
FIGS. 18A, 18B and 18C are diagrams illustrating the effects of an apparatus for inspecting and measuring a semiconductor device, according to an example embodiment.
Figure 18B:
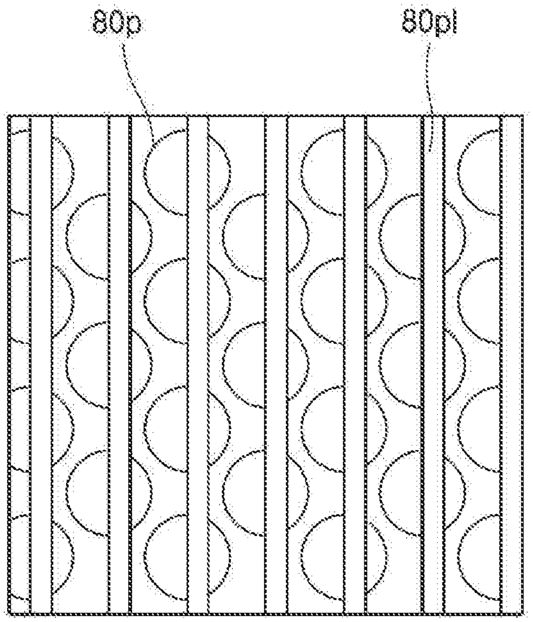
Figure 18C:
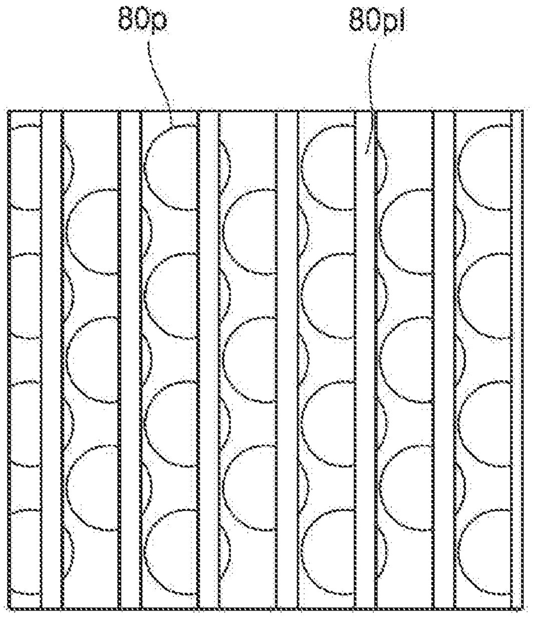

FIG. 17 is a diagram illustrating the amount of light according to a wavelength for each measurement region of a wafer, according to an example embodiment. FIGS. 18A, 18B and 18C are diagrams illustrating the effects of an apparatus for inspecting and measuring a semiconductor device, according to an example embodiment.

Referring to FIGS. 1 and FIGS. 17 to 18C, the wafer 80 may include a plurality of measurement regions (e.g., measurement region 82), and the intensity according to the wavelength may be measured for each of the measurement regions 82. The graph 1700 indicates the intensity according to the wavelength for each of the measurement regions 82. The horizontal axis of the graph 1700 shows the wavelength, and the vertical axis of the graph shows the intensity. The horizontal axis and the vertical axis of the graph 1700 are represented by an arbitrary unit (hereinafter, referred to as a.u.). The intensity may indicate, for example, reflectance.

The apparatus 1 for inspecting and measuring a semiconductor device may measure the structure of the wafer 80 using the intensity according to the wavelength. The measurement of the structure may refer to a process of effectively detecting whether components of the object to be measured have been aligned. For example, in the measurement of the structure, the case in which a wafer pattern 80*p* is not aligned with a wafer pattern line 80*p*1 may be effectively detected.

FIGS. 18A to 18C illustrate the effect of the apparatus 1 for inspecting and measuring a semiconductor device using the alignment state of the wafer pattern 80*p* and the wafer pattern line 80*p*1. As shown in FIG. 18A, when the center of the wafer pattern 80*p* coincides with the center of the wafer pattern line 80*p*1, the wafer pattern may be perfectly aligned with the wafer pattern line 80*p*1. As shown in FIG. 18B, when the center of the wafer pattern 80*p* does not coincide with the center of the wafer pattern line 80*p*1, the alignment level may be changed according to the degree of separation between the center of the wafer pattern 80*p* and the center of the wafer pattern line 80*p*1. As shown in FIG. 18C, as the degree of separation between the center of the wafer pattern 80*p* and the center of the wafer pattern line 80*p*1 increases, the misalignment level between the center of the wafer pattern 80*p* and the center of the wafer pattern line 80*p*1 may increase. In contrast, as the degree of separation between the center of the wafer pattern 80*p* and the center of the wafer pattern line 80*p*1 decreases, the misalignment level between the center of the wafer pattern 80*p* and the center of the wafer pattern line 80*p*1 may decrease.

FIG. 18A illustrates a state where the wafer pattern 80*p* is perfectly aligned with the wafer pattern line 80*p*1. FIGS. 18B and 18C illustrate a state where the wafer pattern 80*p* is misaligned with the wafer pattern line 80*p*1. The misalignment level between the wafer pattern 80*p* and the wafer pattern line 80*p*1 of FIG. 18C may be greater than the misalignment level between the wafer pattern 80*p* and the wafer pattern line 80*p*1 of FIG. 18B.

The alignment level of the wafer pattern 80*p* and the wafer pattern line 80*p*1 may be measured using the intensity according to the wavelength for each measurement region 82. The measurement may be performed by executing the correlation analysis algorithm and/or the main component analysis algorithm, described with reference to FIG. 13.

FIGS. 19A, 19B, 19C and 19D are diagrams illustrating a method of inspecting and measuring a semiconductor device, according to an example embodiment.

Referring to FIG. 1 and FIGS. 19A to 19D, a defect on a plurality of measurement regions 82 of the wafer 80 may be inspected, and the structure may be measured by using the spectral images 20. The defect may refer to, for example, a defect in a repeated pattern, and the measurement of the structure may refer to detecting whether the components of the object to be measured are aligned with each other. The defect may be effectively detected using a plurality of wavelengths using a process shown in FIGS. 16A and 16B. In addition, the structure may be effectively measured by measuring intensity for each wavelength using a process shown in FIG. 17. In FIGS. 19A to 19D, measurement regions 82 having a defect may be referred to as a first care area CA1, a second care area CA2, and a third care area CA3, respectively.

Figure 19A:
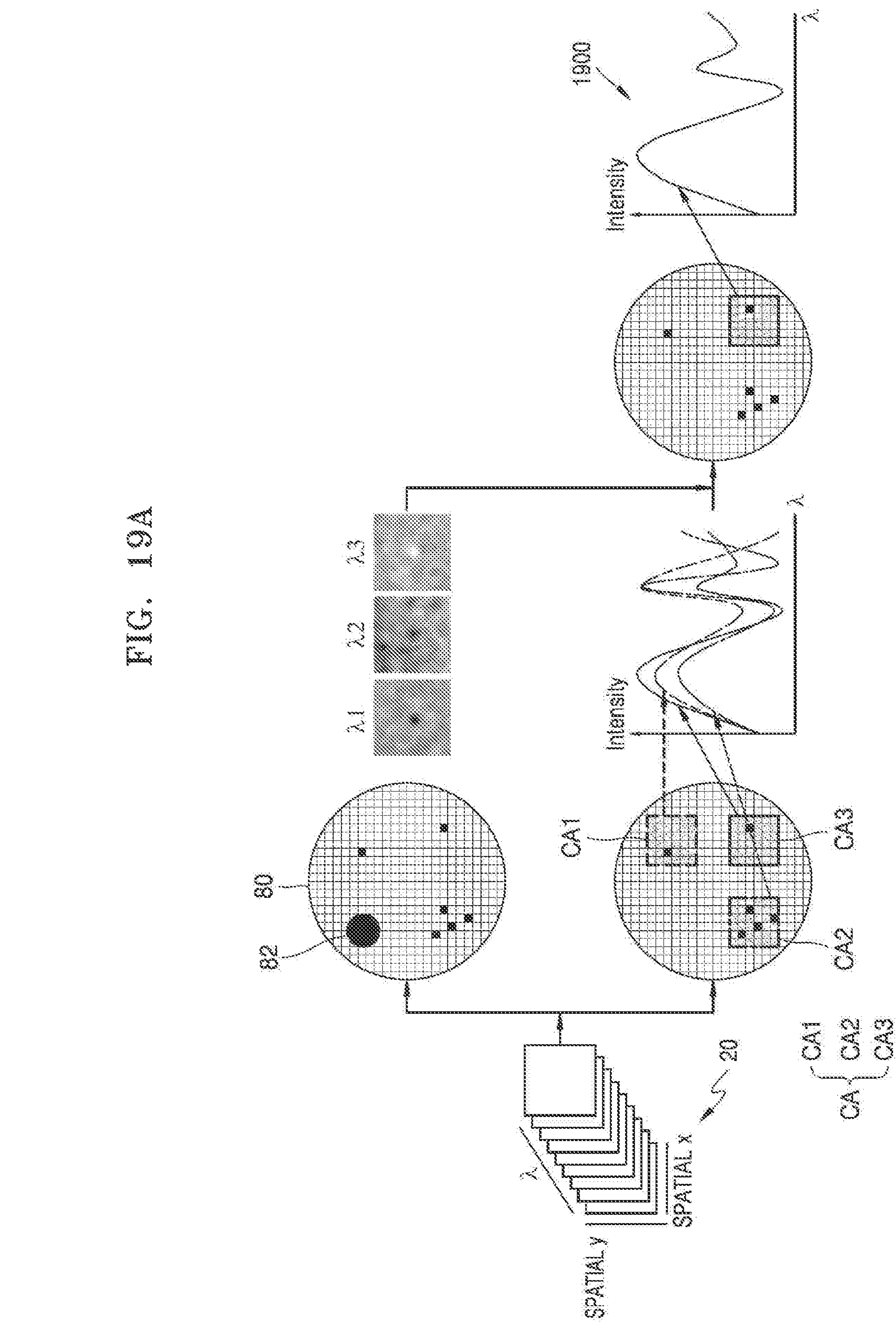
FIGS. 19A, 19B, 19C and 19D are diagrams illustrating a method of inspecting and measuring a semiconductor device, according to an example embodiment.
Figure 19B:
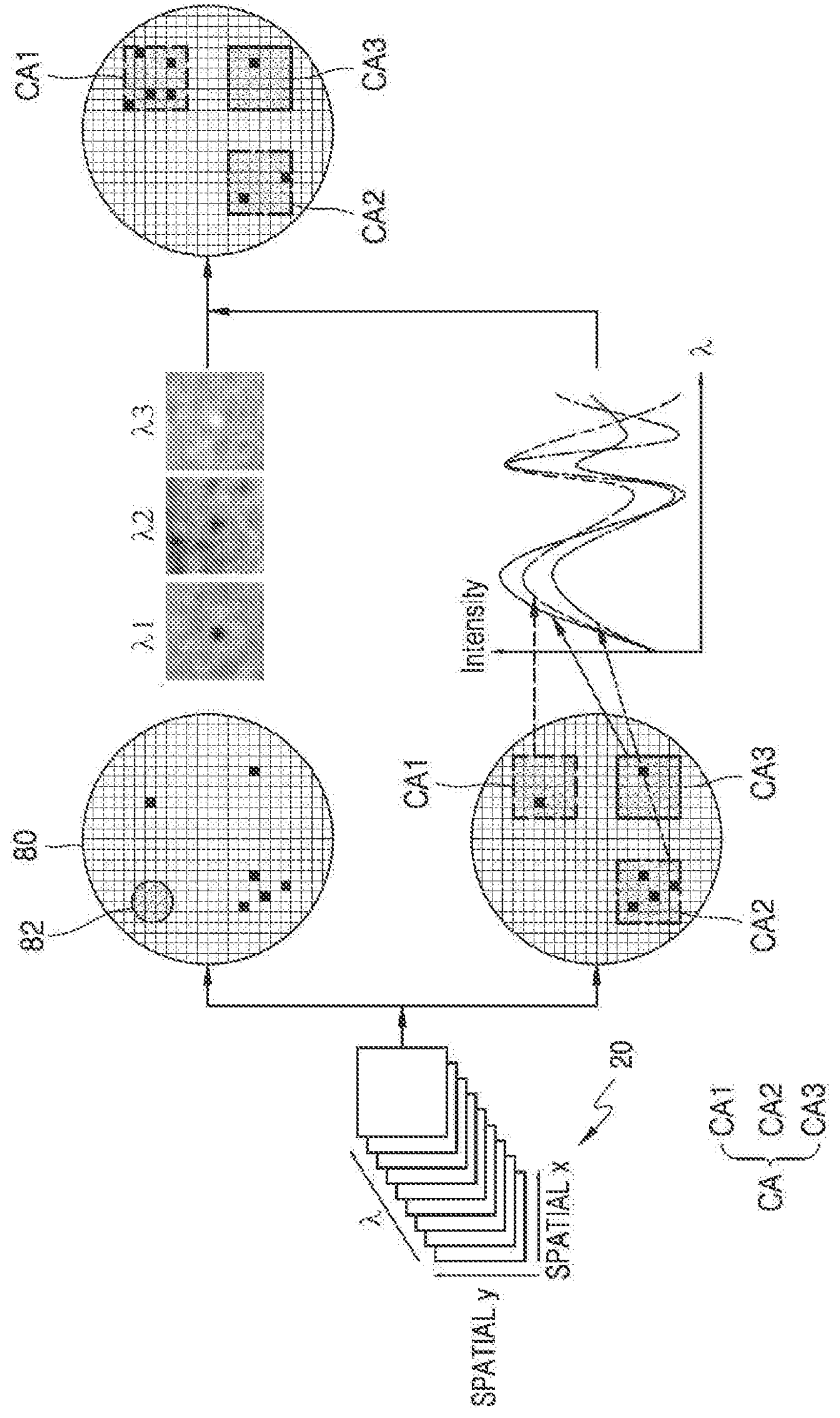
Figure 19C:
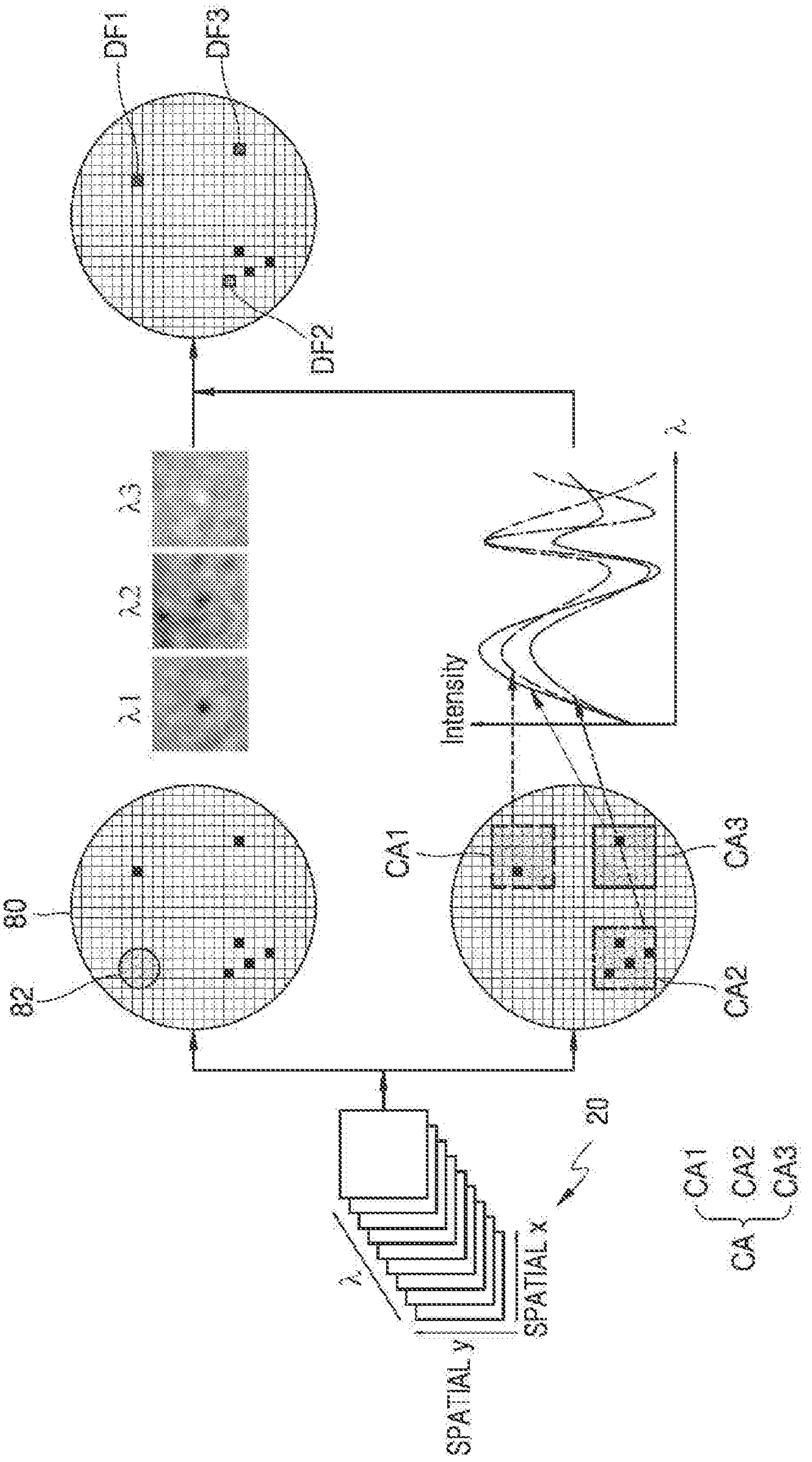

In FIGS. 19A-19C, positions where a defect has been detected on the wafer 80 are shown (e.g., the blackened squares), and intensities according to the wavelength for each of the care areas (e.g., CA1, CA2 and CA3) of the wafer 80 are shown.

FIG. 19A includes a graph 1900 showing the analysis of intensity according to the wavelength except for positions where a defect has been detected, in order to precisely measure the intensity according to the wavelength for each measurement region 82. As the position where a defect has been detected, and/or the peripheral region of the position, where the defect has been detected, are exempted, the noise of the measurement result may be decreased.

FIG. 19B is a diagram showing the change of the threshold value between care areas CA and the analysis on the change, in order to precisely measure the intensity according to the wavelength for each measurement region 82. For example, the threshold value of the first care area CA1 may be increased, and the threshold value of the second care area CA2 may be decreased. Therefore, the first care area CA1 is a sensitivity-decreased care area CA, and the second care area CA2 is a sensitivity-increased care area CA. As the sensitivity of the first care area CA1 increases, more defects may be detected. In addition, as the sensitivity of the second care area CA2 decreases, less defects may be detected.

FIG. 19C is a diagram showing a process of confirming that different kinds of defects are arranged, using the intensity according to the wavelength for each care area CA. For example, a first defect DF1 may be on the first care area CA1, a second defect DF2 may be on the second care area CA2, and a third defect DF3 may be on the third care area CA3. The first to third defects DF1, DF2 and DF3 may be classified by the intensity according to the wavelength. The classification may be performed by execution of the correlation analysis algorithm and/or the main component analysis algorithm, described with reference to FIG. 13.

Figure 19D:
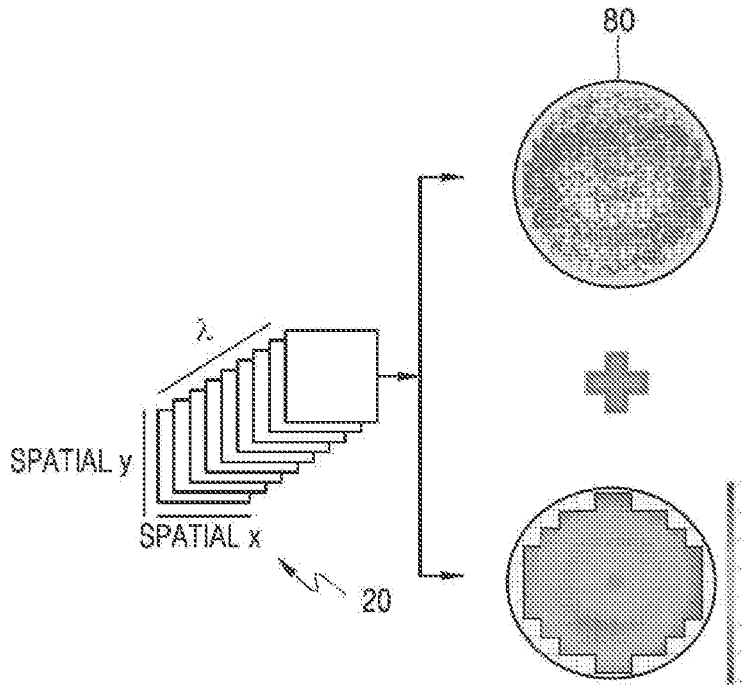

FIG. 19D shows that the wafer 80 may be differently managed for different measurement regions (e.g., 82 of FIG. 19A), based on the defect inspection result of the wafer 80 and the measurement result of the wafer 80. For example, when there are multiple defects and misaligned components on a certain measurement region 82, a relatively high level of management may be required for the measurement region (e.g., 82 of FIG. 19A). In contrast, when there are a small number of defects and misaligned components on a certain measurement region (e.g., 82 of FIG. 19A), a relatively low level of management may be required for the measurement region (e.g., 82 of FIG. 19A).

In an apparatus and method for inspecting and measuring semiconductor device of example embodiments of the disclosure, a wafer may be quickly and precisely inspected by inspecting the wafer in a TDI scanning process. Thus, a wafer may be effectively managed by simultaneously performing defect inspection and structure measurement as is disclosed herein.

Although the disclosure been described in connection with some embodiments illustrated in the accompanying drawings, it will be understood by one of ordinary skill in the art that variations in form and detail may be made therein without departing from the spirit and essential feature of the disclosure. The above disclosed embodiments should thus be considered illustrative and not restrictive.

What is claimed is:

1. An apparatus for inspecting and measuring a semiconductor device, the apparatus comprising:
- a stage on which an object to be measured is provided;
- a detector configured to detect a spectral image from light reflected from the object to be measured; and
- a processor configured to generate a spectral matrix based on the spectral image detected by the detector,
- wherein the detector comprises a time delayed integration (TDI) sensor configured to detect the spectral image based on a TDI process.

2. The apparatus of claim 1, further comprising:
- a light source configured to emit incident light;
- an object lens configured to transmit the incident light emitted by the light source and transmit the reflected light, wherein the reflected light comprises the incident light reflected from a surface of the object to be measured; and
- a light-condensing optical system configured to form an exit pupil of the object lens on the detector.

3. The apparatus of claim 1, wherein the processor comprises:
- a first processing device configured to:
  - convert a plurality of spectral images detected by the detector into the spectral matrix;
  - store the spectral matrix, and generate, based on the spectral matrix, a first spectrum indicating a change in intensity according to a wavelength of each pixel in a measurement sample; and a second processing device configured to select a wavelength band of an optimal condition for a measurement variable based on the first spectrum generated by the first processing device.

4. The apparatus of claim 3, wherein the second processing device is further configured to perform at least one of:

a correlation analysis algorithm for measuring a similarity between the first spectrum generated by the first processing device and an ideal spectrum value, and a main component analysis algorithm for selecting a wavelength band in which a displacement of the measurement variable is the largest within the first spectrum.

5. The apparatus of claim 1, wherein the detector further comprises a wavelength filter provided on the TDI sensor and configured to transmit the reflected light of a certain wavelength band.

6. The apparatus of claim 5, wherein the detector comprises a plurality of wavelength filters, and wherein each of the plurality of wavelength filters comprises a red, green, blue (RGB) filter.

7. The apparatus of claim 1, wherein the stage is configured to be movable in a horizontal direction, and wherein the detector is further configured to photograph the object to be measured while the stage moves in the horizontal direction.

8. An apparatus for inspecting and measuring a semiconductor device, the apparatus comprising:

a stage on which an object to be measured is provided;

a light source configured to emit broadband incident light;

a first polarizer configured to change a first polarization characteristic of the broadband incident light emitted by the light source;

an object lens configured to transmit the broadband incident light and transmit light reflected from a surface of the object to be measured;

a second polarizer configured to change a second polarization characteristic of the reflected light;

a detector configured to detect a spectral image from the reflected light;

a light-condensing optical system configured to form an exit pupil of the object lens on the detector; and a processor configured to generate a spectral matrix based on a plurality of spectral images detected by the detector, wherein the stage is configured to be movable in a horizontal direction, wherein the detector comprises:

a time delayed integration (TDI) sensor; and a plurality of wavelength filters provided on the TDI sensor, wherein the detector is further configured to:

detect the spectral image with the TDI sensor based on a TDI process; and detect a certain wavelength band with the plurality of wavelength filters.

9. The apparatus of claim 8, wherein the plurality of wavelength filters comprises at least a first wavelength filter, a second wavelength filter, and a third wavelength filter, wherein the first wavelength filter is configured to transmit first light of a wavelength between about 450 nm and about 490 nm, wherein the second wavelength filter is configured to transmit second light of a wavelength between about 495 nm and about 570 nm, and wherein the third wavelength filter is configured to transmit third light of a wavelength between about 630 nm and about 750 nm.

10. The apparatus of claim 8, further comprising a light monitor configured to determine whether the light source is normal by measuring an intensity of the broadband incident light.

11. The apparatus of claim 8, further comprising a review camera configured to detect a review image for the surface of the object to be measured.

* * * * *